United States Patent
Suzuki et al.

[11] Patent Number: 5,493,610
[45] Date of Patent: Feb. 20, 1996

[54] CIRCUIT MULTIPLE TRANSMISSION SYSTEM

[75] Inventors: Shigeaki Suzuki; Yuhshi Naito; Wataru Fushimi, all of Kanagawa, Japan

[73] Assignee: Mitsubishi Denki Kabushiki Kaisha, Tokyo, Japan

[21] Appl. No.: 84,531

[22] Filed: Jun. 28, 1993

[30] Foreign Application Priority Data

Jul. 1, 1992 [JP] Japan ................... 4-174067

[51] Int. Cl.⁶ ............................... H04M 11/00
[52] U.S. Cl. .................. 379/100; 379/96; 370/60; 370/85.7; 358/434; 358/468
[58] Field of Search ................ 379/100, 96–99, 379/93, 94; 370/84, 79, 112, 118, 60, 94.1, 85.7, 95.1, 95.3; 358/400, 434, 437, 438, 442, 468

[56] References Cited

U.S. PATENT DOCUMENTS

| | | | |
|---|---|---|---|
| 4,727,536 | 2/1988 | Reeves et al. | 370/84 |
| 4,769,811 | 9/1988 | Eckberg, Jr. et al. | 370/60 |
| 4,771,335 | 9/1988 | Obara . | |
| 4,779,267 | 10/1988 | Limb | 370/94.1 |
| 4,910,610 | 3/1990 | Utsugi . | |
| 4,984,264 | 1/1991 | Katsube | 370/60 |
| 5,029,164 | 7/1991 | Goldstein et al. | 370/95.1 |
| 5,115,429 | 5/1992 | Hluchyj et al. | 370/94.1 |
| 5,117,453 | 5/1992 | Piasecki et al. . | |
| 5,170,395 | 12/1992 | Shinmyo | 370/95.3 |
| 5,193,151 | 3/1993 | Jain | 370/60 |
| 5,319,638 | 7/1994 | Lin | 370/60 |
| 5,377,327 | 12/1994 | Jain et al. | 370/94.1 |

FOREIGN PATENT DOCUMENTS

| | | |
|---|---|---|
| 0084125 | 7/1983 | European Pat. Off. . |
| 62-47255 | 2/1987 | Japan . |
| 1-78572 | 3/1989 | Japan . |
| 2187611 | 9/1987 | United Kingdom . |

Primary Examiner—Wing F. Chan
Attorney, Agent, or Firm—Wolf, Greenfield & Sacks

[57] ABSTRACT

In a circuit multiplex transmission system for transmitting speech/facsimile signals, a transmission circuit allocation control unit outputs a data transmission rate designation signal according to the load of the transmission circuit. A facsimile procedure operating unit operates a facsimile procedure, by reloading a control signal to be used for controlling the facsimile procedure or by selectively causing a training, which takes place prior to sending a message, to end in failure, in such a manner that a facsimile base band data transmission rate will be a rate designated by a transmission rate designation information. The result is that since the facsimile base band data transmission rate is controlled according to the load of the transmission circuit, it is possible to accommodate the same number of input telephone lines as that if every input signal is a speech signal.

14 Claims, 7 Drawing Sheets

CIRCUIT MULTIPLE TRANSMISSION SYSTEM

BACKGROUND OF THE INVENTION

1. Field of the Invention

This invention relates to a circuit multiple transmission system for transmitting speech and facsimile signals at high efficiency.

2. Description of the Related Art

As demand for communications has increased in recent years, request for high-efficiency transmission of voice over telephone, which is the majority of the communication demands, is on the rise. Answers to this request have been realized as a DSI (Digital Speech Interpolation) system, which improves the voice transmission efficiency by sending only the voice with sound by utilizing that the rate of voice with sound of voice over telephone is at most 40%, and a various kinds of speech encoders, which encode a speech signal in terms of number of bits less than the conventional PCM method.

An effective means for improving the line efficiency in international lines such as satellite communications and submarine cables has been realized as a DCME (Digital Circuit Multiple Equipment), which is a combination of the DSI system and the speech encoder. In the DCME using the ADPCM (Adaptive Differential Pulse Code Modulation) method as the speech encoding method, it is possible to increase the line efficiency about two and half times by the DSI process and about two times by the speech encoding, i.e. about five times in total, compared to the conventional case where a speech signal is sent as digital data at 64000 b/s by the PCM encoding method. Namely, assuming that all telephone line input signals are speech signals, the DCME by the ADPCM-DSI method can accommodate transmission lines about five times the PCM telephone lines of 64000 b/s, in terms of which the transmission circuit capacity as telephone line input is calculated. Of course, if telephone lines more than those are input, or if the voice activity of the input telephone lines is higher than expected, the transmission circuit capacity of the DCME would be in-sufficient, namely, there would be no remaining transmission lines to be allocated for the head portion of a speech, which is part of sound signal, so that the head portion of the speech will be cut off to deteriorate the conversation quality.

On the other hand, terminals to be connected to the telephone lines are exemplified by telephones and facsimiles. With the recent rapid spread of facsimiles, it cannot be presumed that in the DCME of the ADPCM-DSI method, every input signal is a voice signal. As a result, it would be Impossible to accommodate the input telephone lines five times the transmission circuit capacity so that circuit efficiency cannot be increased as expected. This is true because the signal of the trunk channel in facsimile communication is active in the majority of communication time so that the voice activity, which is essential for DSI, is sharply increased along with the rate of facsimile signals.

In an effort to solve this problems, facsimile signal base band transmission technology has currently been introduced which improves the transmission efficiency of facsimile signals by demodulating facsimile signals, i.e. voiceband data signals, for transmission as base band data and by modulating the voiceband data signal again at the receiver's system. A system for high-efficiency transmission of voice/facsimile signals utilizing this transmission technology and the above-mentioned DCME in combination is now put on the market.

Figure 8:
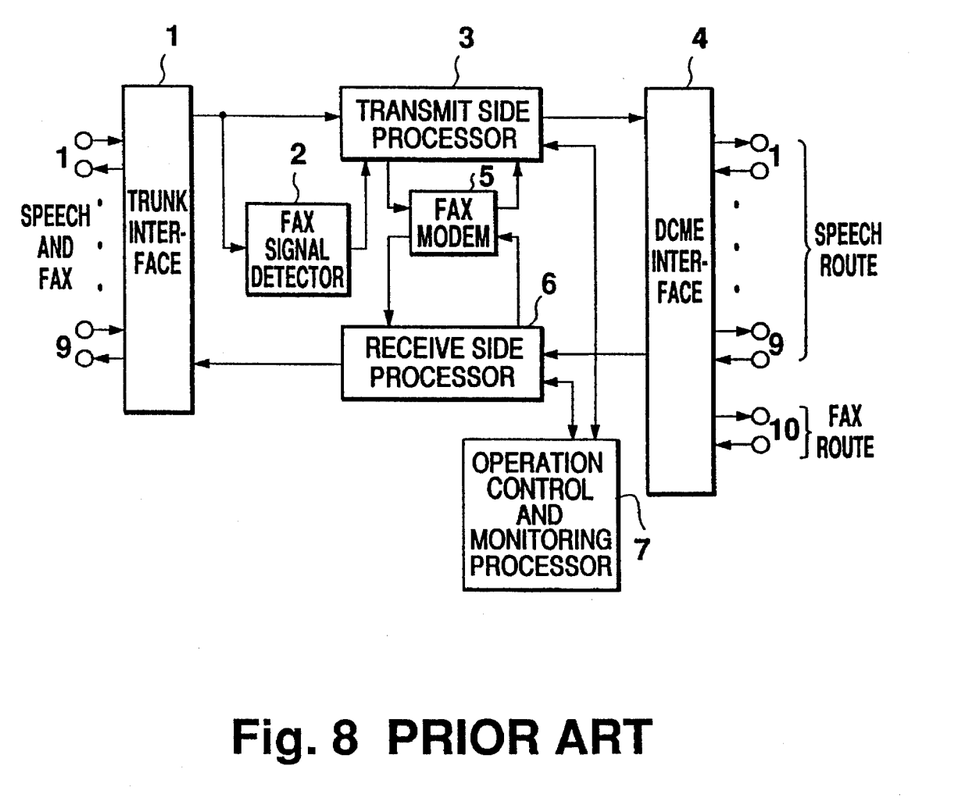
FIG. 8 is a block diagram showing a circuit multiple transmission system according to the prior art.

FIG. 8 shows this conventional type system, which is disclosed in "Development of Facsimile Signal Demodulation Multiple Equipment" by Mitsuhiro Takemoto, et al., Collection of Lectures and Theses presented at 1991 Spring Meeting of Japan Electronic Information Communication Society, vol. 3, pp. 331. As shown in FIG. 8, reference numeral 1 designates a trunk interface; 2, a facsimile signal detector; 3, a sending processor; 4, a DCME interface; 5, a facsimile modem; 6, a receiving processor; and 7, an operations check processor. With this system, if it is inserted between DCME and the trunk circuit and is used in combination with DCME, it is possible to realize high-efficiency transmission of speech/facsimile signals.

In operation, the trunk interface 1 can accommodate trunk lines of digital primary groups of at most nine systems. An input signal of each trunk channel is output to the facsimile signal detector 2 and the sending processor 3 via the trunk interface 1. The facsimile signal detector 2 discriminates whether or not the input signal of each channel is a facsimile signal and outputs the result of discrimination to the sending processor 3. By the result of discrimination, the sending processor 3 outputs the input signal of the channel, which signal has been judged as a speech signal, to the DCME interface 4 as it is, and outputs the input signal of the channel, which signal has been judged as a facsimile signal, to the facsimile modem 5. The facsimile modem 5 demodulates an input voiceband data signal of each channel and outputs the demodulated signal to the sending processor 3. The sending processor generates facsimile signal allocation data and multiplexes the demodulated facsimile signal and the facsimile signal allocation data and outputs it to the FAX route of the DCME interface 4. The DCME interface 4 includes interfaces of digital primary group of nine systems as the speech route and of one system as the FAX route and inputs and outputs speech/facsimile signal from and to the DCME.

At the receiver's system, the signal input via the DCME interface 4 is input to the receiving processor 6 where the demodulated facsimile signal input from the FAX route is output to the facsimile modem 5 based on the facsimile signal allocation data. The facsimile modem 5 modulates the demodulated facsimile signal and outputs the resulting signal to the receiving processor 6. The receiving processor 6 outputs facsimile signals, which are input from the facsimile modem 5, to the trunk interface 1 for the channels occupied by facsimile transmission and outputs signals, which are input from the speech route of the DCME interface 4, to the same trunk interface 1 for the other channels. Then the trunk interface 1 outputs speech/facsimile signals to the trunk circuit.

The operations check processor 7 sets up a facsimile channel for the FAX route in terms of 64000 b/s and sends the set-up data to DCME. The DCME multiplexes the signals, which are input from the speech route, after the high-efficiency speech encoding by the DSI process and the DPCH method and sends the resulting signals and sends the resulting signals, and meanwhile, it continues allocating the individual transmission lines for the facsimile channel of the FAX route. Since the base band data transmission rate of the facsimile signals is 9600 b/s at maximum, which is less than a half, as compared with 32000 b/s or 24000 b/s of the speech signal transmission rate encoded by the ADPCM method, high-efficiency transmission of speech/facsimile signals can be achieved as the effect of DSI is free from being deteriorated by the facsimile signals.

In recent years, 8000 to 16000 b/s speech encoding methods which encode speech signals at lower bit rate than the ADPCM method, have been put to practical use. By combining such low bit rate speech encoding method, DSI technology and facsimile signal base band sending technology, it is possible to realize a circuit multiple transmission system which can transmit speech/facsimile signals at a much higher efficiency.

Now assume that the circuit multiple transmission system equipped with a high-efficiency speech encoder for encoding voice at 9600 b/s accommodates an n-channel trunk circuit. Since the number of speech channels of the transmission circuit can be reduced to about a half the number of accommodated trunk channels by the effect of DSI, it is possible to send voice over the transmission circuit of (n/2)×9600 b/s. Since the base band data transmission rate of facsimile signals is usually 9600 b/s if the terminal is a GIII facsimile, it is possible to send the facsimile signals to n/2 channels over the transmission circuit of (n/2)×9600 b/s. However, when sending facsimile signals, it is required to continue allocating the sending side channels during facsimile transmission, unlike speech transmission, from start to end; therefore, assuming that all trunk channels are occupied by facsimile transmission, the transmission circuit requires n×9600 b/s. Therefore, with the circuit multiple transmission system equipped with such low bit rate speech encoder, it is difficult to improve the transmission efficiency of voice by DSI. In other words, the transmission circuit capacity is such that it is possible to accommodate telephone line input signals more than those in the case where all input signals are only speech signals.

Another type conventional transmission system is known which is equipped with a high-efficiency speech encoder for encoding voice at two or more bit rates, depending on the load of transmission circuit, so that speech signals can be encoded and sent at a low bit rate if the load is heavy and at a high speed if the load is light. This type system is exemplified by the DCME by ADPCM-DSI method. If facsimile signals, like speech signals, could be sent at 4800 b/s in the case of heavy load of transmission circuit, the foregoing problems would have been overcome. However, since the base band data transmission rate of facsimile signals is decided between the sender's and receiver's facsimile systems during the facsimile communication procedure, it was impossible to transmit facsimile signals at a controlled rate.

SUMMARY OF THE INVENTION

It is therefore an object of this invention to provide a circuit multiple transmission system, such as for speech/facsimile signals, which is equipped with encoding and transmitting functions, such as a DSI function, a high-density and high-efficiency speech encoding function and a facsimile signal base band transmitting function and with which it is possible to accommodate the same number of input telephone lines as that when all input signals are assumed to be speech signals.

According to this invention, there is provided a circuit multiple transmission system comprising:

(a) a transmission circuit allocation control unit for judging a load status of a transmission circuit and designating a multiplexed data transmission rate; and (b) a procedure operating unit for controlling a data transmission rate of an voiceband data signal based on the transmission rate designated by the transmission circuit allocation control unit.

In operation, when the procedure operating unit reloads part of control signals to be sent for procedure control or when the procedure operating unit selectively causes a training, which takes place prior to sending a message, to end in a failure. In other words, if the load of the transmission circuit is heavy, the data transmission rate should be low in order to have adequate room for other data transmission.

DETAILED DESCRIPTION

Embodiment 1

Figure 1:
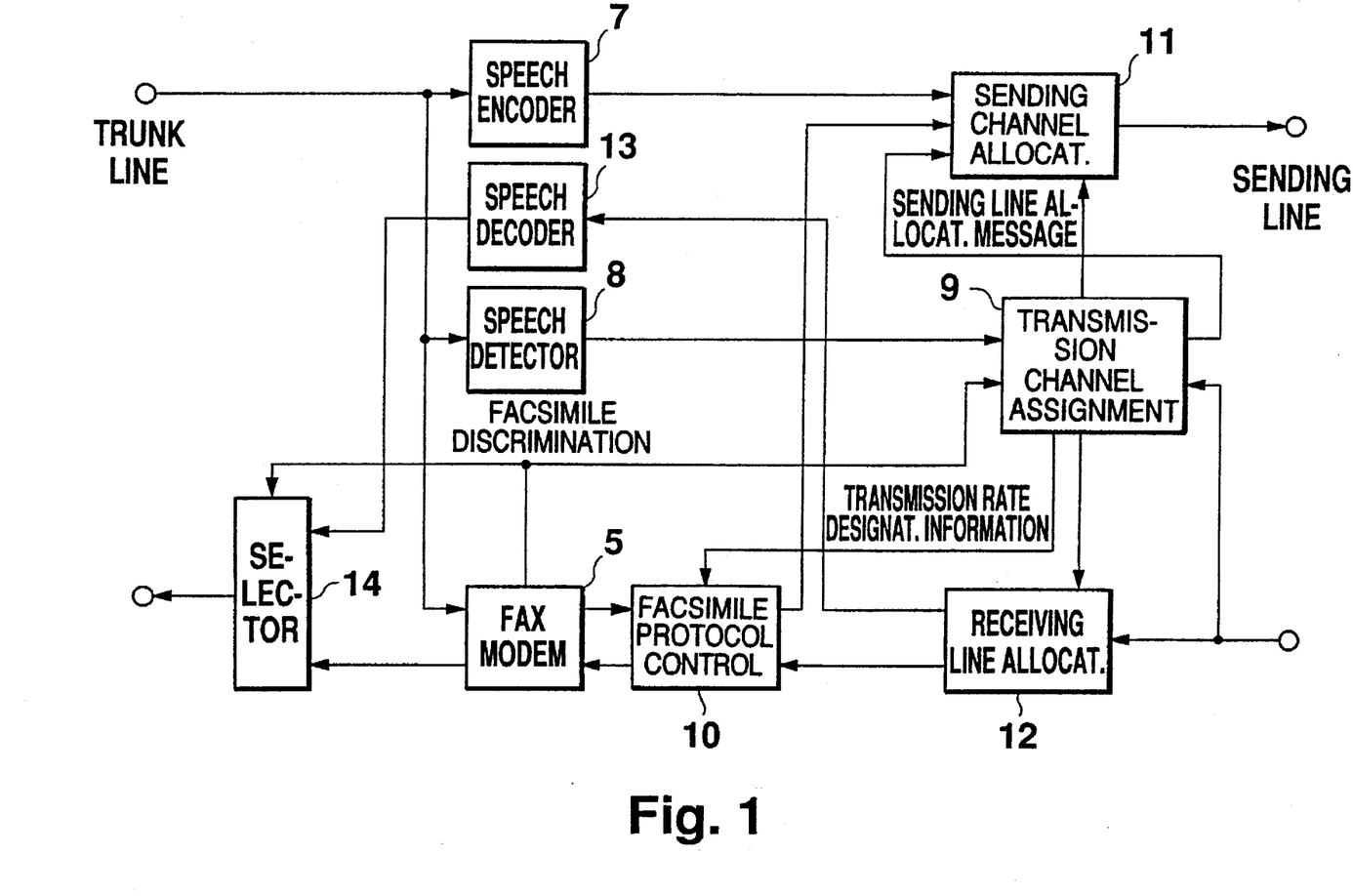
FIG. 1 is a block diagram showing a circuit multiple transmission system according to one embodiment of this invention.

FIG. 1 shows a circuit multiple transmission system according to one embodiment of this invention. In FIG. 1, reference numeral 5 designates a facsimile modem for demodulating the facsimile signals, which have been modulated into voiceband data signals of each trunk channel at the sender's end, into base band data signals; 7, a speech encoder for encoding the speech signals of each channel of the trunk circuit which the system accommodates; 8, a speech detector for discriminating whether the voice of each trunk channel is active or not; 9, a transmission circuit allocation control unit for deciding allocation of the transmission circuit for the encoded speech signal and the facsimile base band data signal at the sender's end and for decoding the transmission circuit allocation for the signals received from the transmission circuit at the receiver's end; 10, a facsimile procedure operating part for operating the facsimile procedure to control the transmission rate of the facsimile base band data signal; 11, a sending line allocating part for allocating the transmission circuit for the encoded speech signal and the facsimile base band data signal by the control of the transmission circuit allocation control part 9 and outputting an allocation signal; 12, a receiving circuit allocating unit for separating input signals from the transmission circuit into the encoded speech signal and the facsimile base band data signal and for outputting the separated signals; 13, a speech decoder for decoding the encoded speech signals of each trunk channel; and 14, a selector for selecting the decoded speech signal or the facsimile signal modulated again into a voiceband data signal to output it to the trunk circuit.

Figure 2:
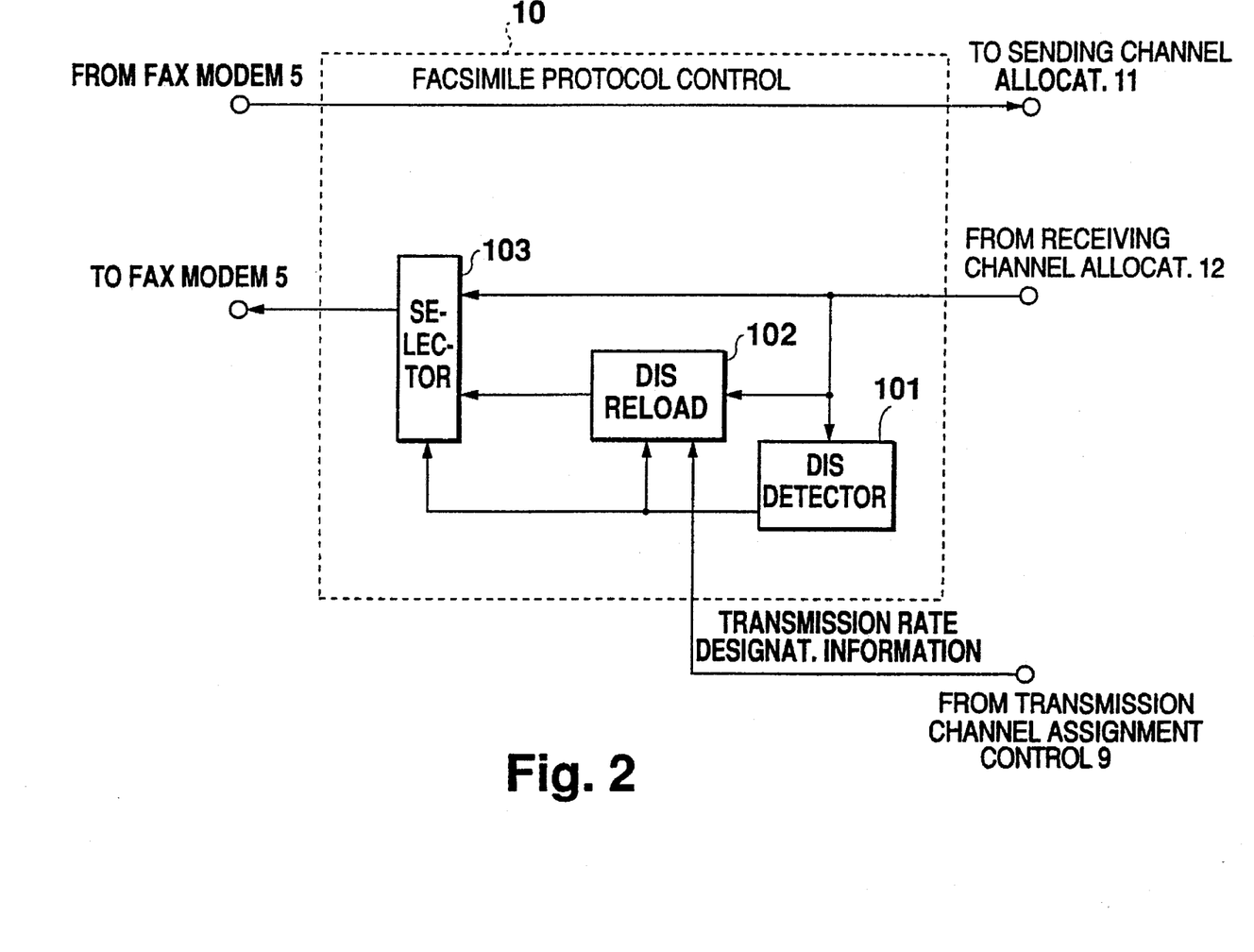
FIG. 2 is a block diagram showing a facsimile procedure operating unit of the circuit multiple transmission system of the invention.

FIG. 2 shows the interior structure of the facsimile procedure operating part 10 of FIG. 1. In FIG. 1, reference numeral 101 designates a DIS detector for detecting whether or not the facsimile signal of each trunk channel is a DIS (Digital Identification Signal); 102, a DIS reloading part for reloading the DIS of each trunk channel, according to a transmission rate designation information, by the control of the DIS detector 101; and 103, a selector for selecting the output of the DIS reloading part 102 or the facsimile base band data signal, which is input from the transmission circuit allocation control part 9, by the control of the DIS detector 101 to output it.

The operation of this system will now be described with reference to FIG. 1. The description will begin with the operation at the sender's end.

In FIG. 1, sending signals of each trunk channel are input to the speech encoder 7, the speech detector 8 and the facsimile modem 5. The speech encoder 7 high-efficiency encodes input signals of each trunk channel and outputs them to the sending line allocating part 11. The speech detector 8 discriminates whether the sending signals are active or not and outputs the result of discrimination to the transmission circuit allocation control part 9. If the sending signals of each trunk channel are facsimile signals, the facsimile modem 5 demodulates the voiceband data signal into a base band data information and outputs it to the facsimile procedure operating part 10, and also outputs an occupied-by-facsimile-transmission notifying signal, which notifies whether or not each trunk channel is occupied by facsimile transmission, to the transmission circuit allocation control part 9 and the selector 14. If it is not necessary to operate the facsimile procedure, the facsimile procedure operating part 10 outputs the sending facsimile base band data signal, which is input from the facsimile modem 5, of each trunk channel to the sending line allocating part 11 without reloading. The operation of the facsimile procedure operating part 10 when the facsimile procedure is necessary to be operated will be described below in detail in connection with FIG. 2.

The transmission circuit allocation control part 9 decides allocation of transmission circuit, according to the result of sound/soundless discrimination, which has been input from the speech detector 8, of each channel and the occupied-facsimile-transmission notifying information input from the facsimile modem 5. Specifically, the transmission circuit should be allocated respectively for the signals of the trunk channel, which signals have been judged as being with sound, among the encoded speech signals of each trunk channel, which signals have been output from the speech encoder 7, and for the signals of the trunk channel, which is occupied by facsimile transmission, among the facsimile base band data signals of each trunk channel, which signals have been output from the facsimile procedure operating unit 10. The transmission circuit allocation control unit 9 then outputs the decided transmission circuit allocation data to the sending line allocating unit 11 and generates a transmission circuit allocation message for sending the allocation data to the receiver's system and outputs the message to the sending line allocating unit 11.

Further, the transmission circuit allocation control unit 9 outputs the facsimile transmission rate designation information, which gives an upper limit of the facsimile base band data transmission rate, to the facsimile procedure operating unit 10. Depending on the load of the transmission circuit, a low rate is given to the facsimile transmission rate designation information, if both the number of the trunk channels judged as being with sound and the number of the trunk channels occupied by facsimile transmission are great and if it will be difficult to allocate the transmission circuit to the speech signal, which has freshly been with sound, of the trunk channel and the facsimile base band signal. On the contrary, a high speed is given to the facsimile transmission rate designation information, if both the number of trunk channels judged as being with sound and the number of trunk channels occupied by facsimile transmission are small.

The operation of this system at the receiver's end will now be described.

The encoded speech signal from the transmission circuit, the facsimile base band data signal and the received signal, which the transmission circuit allocation message is multiplexed, are input to the transmission circuit allocation control unit 9 and the receiving line allocating unit 12. The transmission circuit allocation control unit 9 extracts and decodes the transmission circuit allocation message and then outputs the receiving line allocation data to the receiving line allocating unit 12. Based on the receiving line allocation data input from the transmission circuit allocation control unit 9, the receiving line allocating unit 12 outputs the encoded speech signals of the received signals to the corresponding trunk channel of the sending line allocating unit 11 and, at the same time, outputs the facsimile base band data signal of the received signals to the corresponding trunk channel of the facsimile procedure operating unit 10. If it is necessary to operate the facsimile procedure, the facsimile procedure operating unit 10 outputs the received facsimile base band data signal, which has been input from the receiving line allocating unit 12, of each trunk channel and outputs it to the facsimile modem 5. The facsimile modem 5 modulates the received facsimile base band data signal, which has been input from the facsimile procedure operating unit 10, of each trunk channel into a voiceband data signal and outputs the voiceband data signal to the selector 14. According to the occupied-facsimile-transmission notifying information input from the facsimile modem 5, the selector 14 selectively outputs the output of the facsimile modem 5 for the trunk channel occupied by facsimile transmission and the output of the speech decoder 13 for the remaining channels to the trunk circuit.

Figure 3:
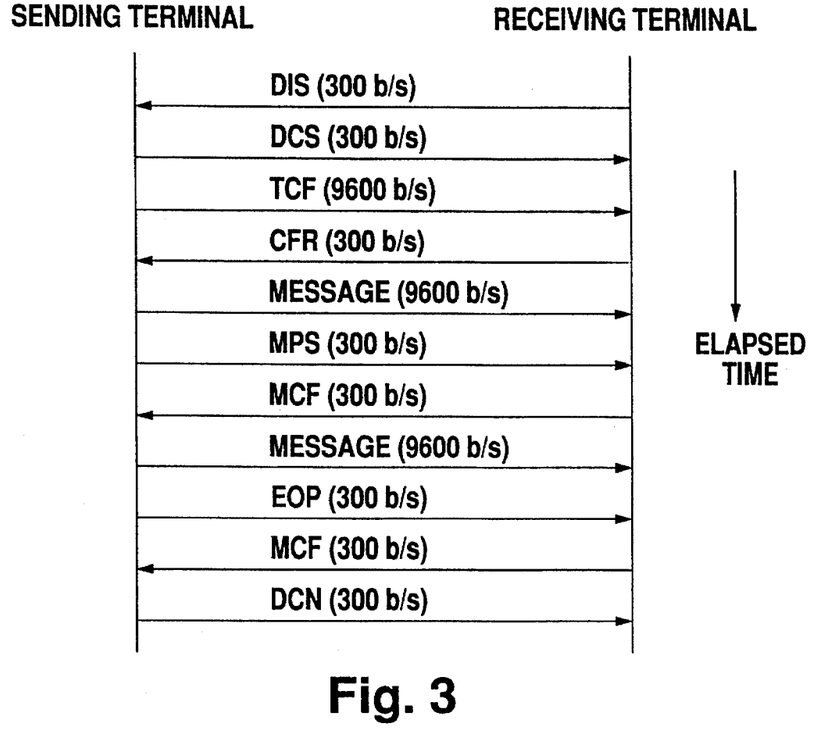
FIG. 3 is a signal sequence diagram showing the usual GIII facsimile procedure.

The operation of the facsimile procedure operating unit 10 of FIG. 1 will now be described. FIG. 3 illustrates the usual facsimile procedure of a GIII facsimile terminal. In FIG. 3, the facsimile terminal at the sender's end (hereinafter called "the sending terminal") transmitted a two-page message to the facsimile terminal at the receiver's end (hereinafter called "the receiving terminal"); the sequence of call connection and disconnection before and after this procedure is omitted.

Upon completion of call connection, firstly DIS (Digital Identification Signal) of 300 b/s is transmitted. The DIS is a signal which indicates the standard capacity of the receiving terminal and in which a receivable data transmission rate also will be indicated when sending a message. The sending terminal recognizes the standard capacity of the receiving terminal from the DIS, sends a DCS (Digital Command Signal) of 300 b/s instructing the receiving terminal to perform the facsimile function to be actually used, and subsequently outputs a TCF (Training Check Flag) at the data transmission rate designated by the DCS. At that time, usually four transmission rates, i.e. 9600 b/s, 7200 b/s, 4800 b/s and 2400 b/s, are usable, it is customary to select the maximum transmission rate of 9600 b/s for TCF. The TCF is a signal in which "0" continues for 1.5 seconds; if it has received "0" continuing for one or more second, the receiving terminal will judge the training to have ended in success and will send a CFR (Confirmation to Receive) of 300 b/s indicating that it is ready to start sending message signals. Upon receipt of the CFR, the sending terminal will send a one-page-message signal and subsequently a MPS (Multi-Page Signal) of 300 b/s indicating the end of page. Upon receipt of the MPS, the receiving terminal will send a MCF (Message Confirmation) of 300 b/s indicating that the message has been received in normal condition.

Subsequently, the message sending and MPS sending from the sending terminal and the MCF sending from the receiving terminal will be repeated until the original will be sent completely at the sending terminal. The sending terminal will send a message signal of the final page and subsequently an EOP (End Of Procedure) of 300 b/s indicating that the sending of all message has been completed. Upon receipt of the EOP, the receiving terminal will send, likewise when receiving the MPS, a MCF (Message Confirmation) of 300 b/s indicating that the message has been received in normal condition. At the sending terminal, after the MCF has been received, a DCN (Disconnect) of 300 b/s notifying the completion of the facsimile procedure and the starting of call disconnection will be sent, thus completing the facsimile procedure.

Figure 4:
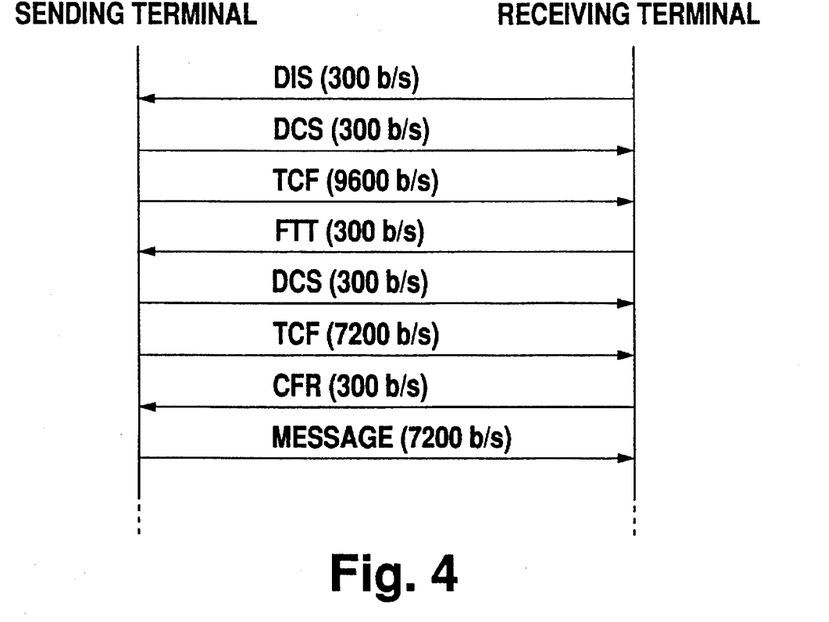
FIG. 4 is a signal sequence diagram similar to FIG. 3, but showing the GIII facsimile procedure when a training has ended in failure.

The foregoing is the description of the facsimile procedure when the training has ended in success in a first attempt. The procedure when the training has ended in failure will now been described In connection with FIG. 4. The procedure of FIG. 4 is similar to that of FIG. 3 up to the TCF sending from the sending terminal. When it could not receive "0" continuing for one or more second, the receiving terminal will judge the training to have ended in failure and will send a FTT (Failure To Train) of 300 b/s indicating the failure of training. The sending terminal recognizes the failure of training upon receipt of the FTT and then performs the DCS sending and the TCF sending again, during which the data transmission rate designated by the DCS will be reduced to 7200 b/s and the TCF also will be sent at 7200 b/s. The receiving terminal will recognize, upon receipt of the DCS, that the data transmission rate has been reduced to 7200 b/s, and will judge, upon receipt of "0" continuing for one or more second at 7200 b/s, the training to have ended in success and will send a CFR. Subsequently, the same procedure as that of FIG. 3 will take place until the facsimile procedure is completed, except that the data transmission rate in message transmission is 7200 b/s.

The operation of the facsimile procedure operating unit 10 will now be described in connection with FIG. 2. Firstly, the facsimile procedure operating unit 10 outputs the received facsimile base band data signal of each channel, which has been input from the facsimile modem 5, to the sending line allocating unit 11 without reloading. The received facsimile base band data signal of each channel output from the receiving line allocating unit 12 will be sent to the DIS detector 101, the DIS reloading unit 102 and the selector 103. The DIS detector 101 supervises the input signal to discriminate whether or not the input signal is a DIS, and outputs the result of discrimination to the DIS reloading unit 102 and the selector 103. Based on the result of discrimination input from the DIS detector 101, the DIS reloading unit 102 will reload the upper capacity limit of the received facsimile base band data signal of each channel, if it is necessary to restrict the facsimile base band data transmission rate, according to the transmission rate designation information input from the transmission circuit allocation control unit 9 and will output the resulting signal to the selector. If no restriction is necessary, the DIS reloading unit 102 will output the received facsimile base band data signal to the selector 103 without reloading. Based on the result of discrimination of the DIS detector 101, the selector 103 will selectively output the output of the DIS reloading unit 102 for the trunk channel in which DIS has been detected and the facsimile base band data signal input from the facsimile modem 5 for the remaining channels.

Now assume that in the foregoing operation the facsimile procedure operating unit 10 has reloaded the bits indicating the message receiving capacity of the receiving terminal, which can receive the DIS at four different rates of 9600 b/s, 7200 b/s, 4800 b/s and 2400 b/s, to such a value that the DIS can be received only at 4800 b/s and 2400 b/s. Since the bits indicating the data transmission rate during the DCS sending in order that the sending terminal should receive the reloaded DIS, the message will be sent at 4800 b/s after a subsequent training at 4800 b/s has ended in success.

Thus, according to this embodiment, it is possible to control the base band data transmission rate of the facsimile signal according to the load of transmission circuit. Partly since the circuit multiple transmission is equipped with the high-efficiency audio encoder for encoding speech into 9600 b/s and accommodates the n-hannel trunk circuit, it is possible to send all facsimile signals by reloading every facsimile base band data transmission rate as 4800 b/s even if all of n channels of trunk circuit are occupied by facsimile transmission when the system has been connected to the transmission circuit of (n/2)×9600 b/s by estimating the transmission efficiency improving result by DSI process by two times.

Embodiment 2

Figure 5:
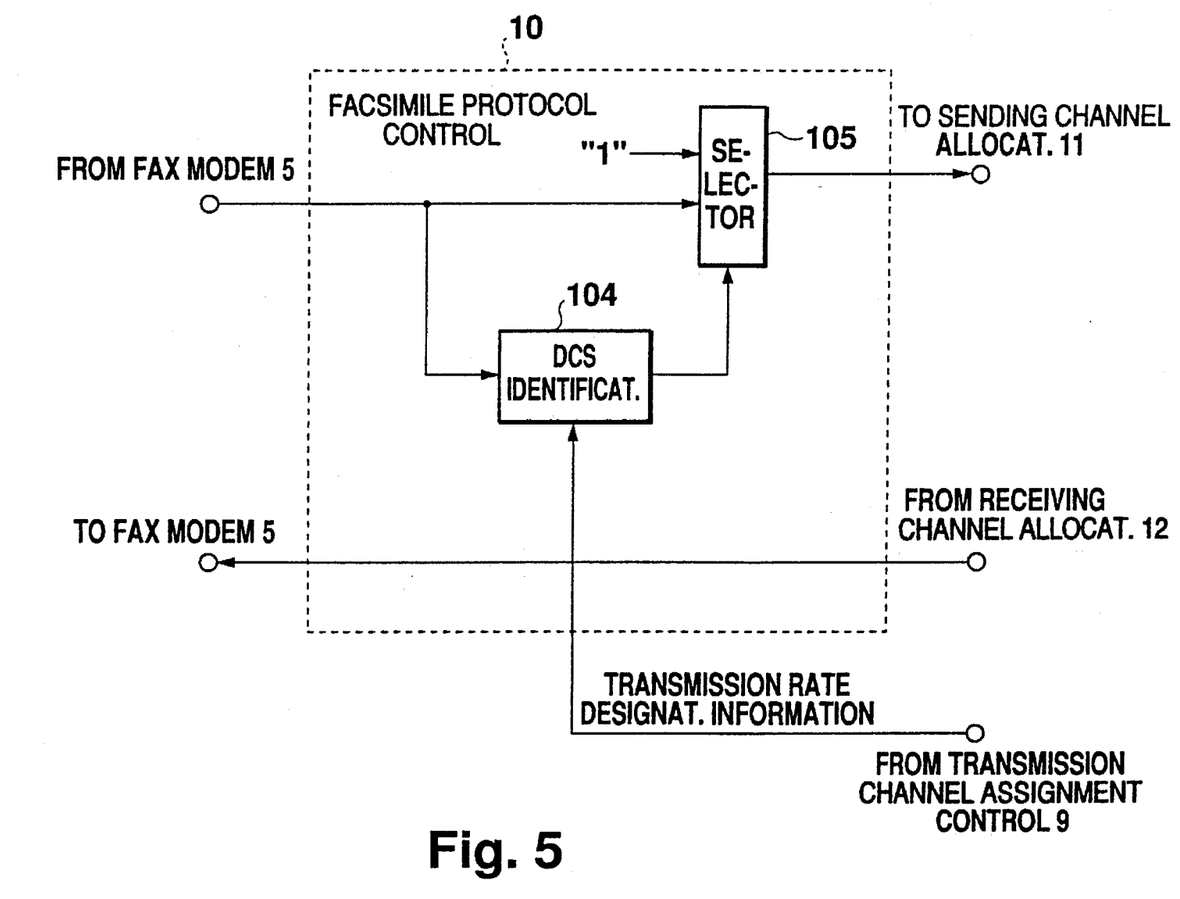
FIG. 5 is a block diagram showing a modified facsimile procedure operating unit of the circuit multiple transmission system of the invention.

In the foregoing embodiment, the facsimile procedure operating unit 10 of FIG. 2 is used. Alternatively, the facsimile procedure operating unit 10 of FIG. 5 may be used which causes the same result. In FIG. 5, reference numeral 104 designates a DCS identification unit for supervising the sending facsimile base band data signal of each trunk channel, which has been input from the facsimile modem 5, to discriminate whether or not the supervised signal is a DCS and for identifying the content of the DCS; and 105, a selector operable by a control signal from the DCS identification unit 104.

The operation of the facsimile procedure operating unit 10 of FIG. 5 will now be described. This facsimile procedure operating unit 10 will output the received facsimile base band data signal of each trunk channel, which has been input from the receiving line allocating unit 12, to the facsimile modem 5 without reloading. The DCS identification unit 104 will control the selector 105 usually so as to select and output the facsimile base band data signal of each trunk channel input from the facsimile modem 5. When a DCS has been detected, the facsimile procedure operating unit 10 will control the selector 105 then so as to select and output "1", as a dummy failure signal while TCF is been input after DCS has been input, to the trunk channel in which the DCS has been detected, if the data transmission rate designated by the DCS is higher than the speed designated by the transmission rate designation information input from the transmission circuit allocation control unit 9, as the result of comparison therebetween.

Figure 6:
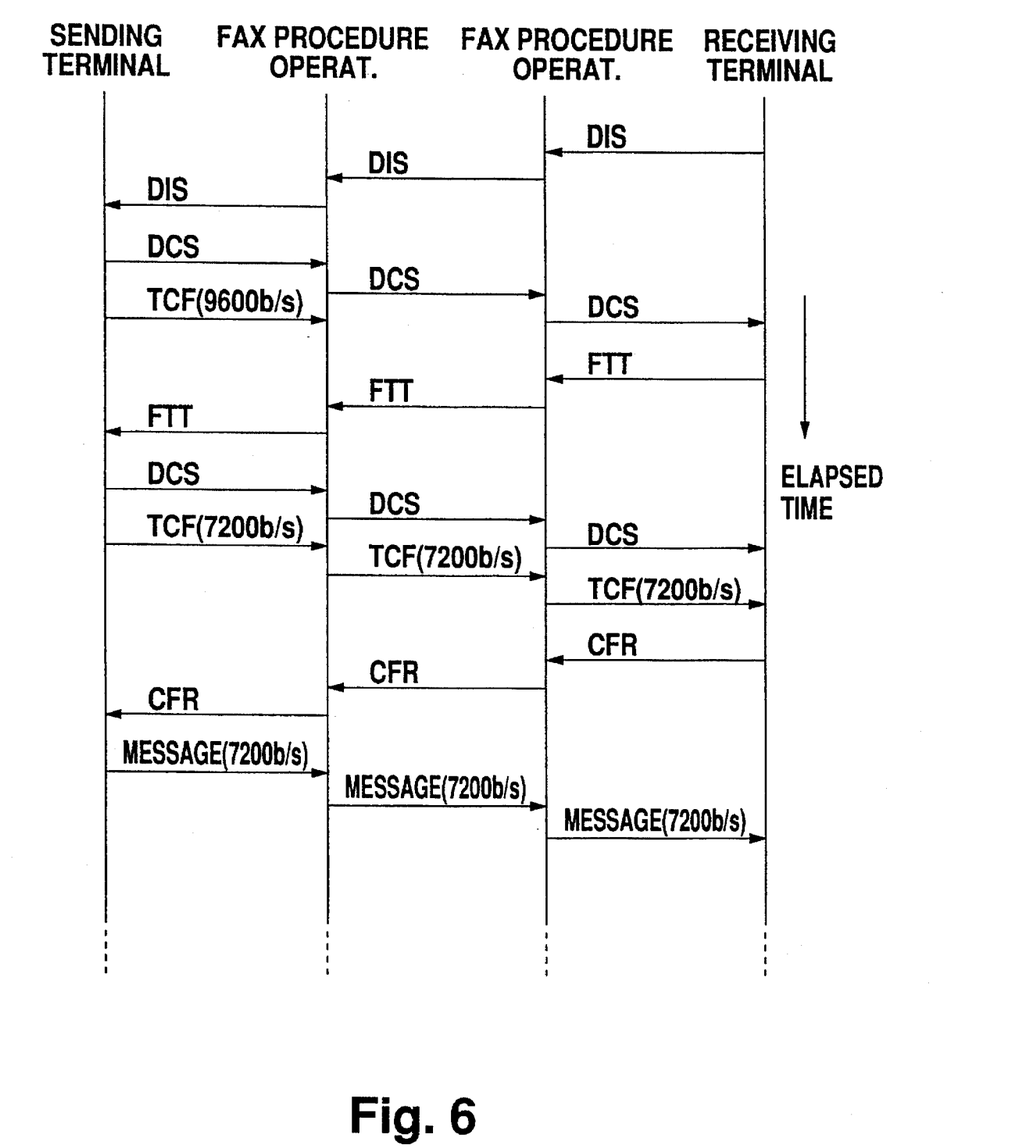
FIG. 6 is a signal sequence diagram showing a GIII facsimile procedure when the facsimile procedure operating unit of FIG. 5 has controlled the facsimile base band data transmission rate.

FIG. 6 illustrates the manner in which the facsimile procedure operating unit 10 performs a facsimile procedure when 7200 b/s is designated for the transmission rate designation information by the transmission circuit allocation control unit 9. Firstly, the DIS output from the receiving terminal will be sent to the sending terminal without reloading. Upon receipt of DIS, the sending terminal will send a DCS, which will designate usually 9600 b/s for the data transmission rate. Since the data transmission rate designated by the DCS output from the sending terminal is higher than the rate designated by the transmission circuit allocation control unit 9, the selector 105 will select and output "1" as a dummy failure signal rather than TCF, for the trunk channel connected to this facsimile terminal, while the TCF is being input. As described above, TCF is a continual signal of "0" continuing for 1.5 seconds, and as a result, the TCF to be sent from the sending terminal will not be transmitted. Since it does not receive the TCF after having received the DCS, the receiving terminal will send a FTT (Failure To Train), which indicates that the training has ended in failure, to the sending terminal. Upon receipt of the FTT, the sending terminal will recognize the failure of training and will resend the DCS. At that time, the data transmission rate designated by the DCS will be reduced to 7200 b/s. As the message transmission rate designated by the DCS is not equal to the rate designated by the transmission circuit allocation control unit 9, the TCF of 7200 b/s sent from the sending terminal to follow the DCS will be sent then up to the receiving terminal. As it receives the TCF after having received the DCS, the receiving terminal will send a CFR indicating that the training has ended in success. After that, the same procedure as that of FIG. 3 will take place until completion of the facsimile procedure.

Also with this facsimile procedure operating unit 10 of FIG. 5, it is possible to control the facsimile base band data transmission rate.

Embodiment 3

Figure 7:
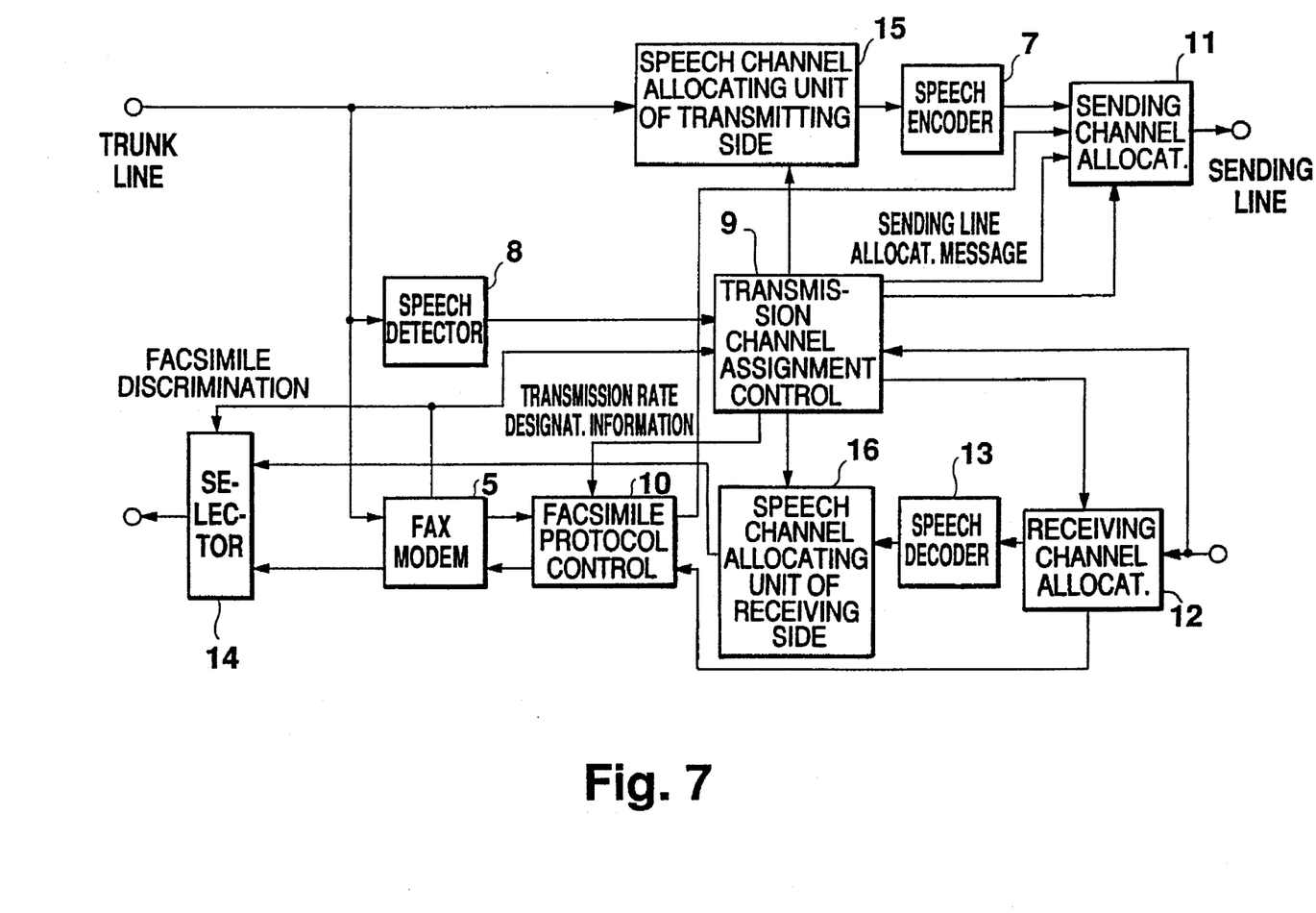
FIG. 7 is a block diagram showing a modified circuit multiple transmission system according to another embodiment of the invention.

FIG. 7 shows another modified circuit multiple transmission system. In FIG. 7, reference numeral 15 designates a speech line allocating unit of the sender; and 16, a speech line allocating unit of the receiver.

The operation of the circuit multiple transmission system will now be described with reference to FIG. 7. As the respective operations of a facsimile modem 5, a speech detector 8, a facsimile procedure operating unit 10 and a selector 14 are similar to those of the corresponding parts of FIG. 1, their description is omitted here for clarity.

The transmission circuit allocation control unit 9, line that of FIG. 1, decides allocation of transmission circuit for the speech signal and the facsimile signal and outputs the transmission circuit allocation data of the speech signal and the transmission circuit allocation information of the audio line to the speech line allocating unit of the sender and the sending line allocating unit 11, respectively. The circuit multiple transmission system is equipped with the same number of speech encoders as the total number of speech channels when all of the transmission circuit has been allocated for the speech signals. According to the transmission circuit allocation data of the speech signals input from the transmission circuit allocation control unit 9, the speech line allocating unit 15 of the sender outputs the speech signals of each trunk channel to the speech encoders 7 of the speech channels corresponding to the allocated transmission circuit. The individual speech encoder 7 encodes the speech signals of each speech channel at low bit rate to send them to the sending line allocating unit 11. According to the transmission circuit allocation data of the facsimile signals input from the transmission circuit allocation control unit 9, the sending line allocating unit 11 allocates the facsimile base band data signals of each trunk channel, which have been input from the facsimile procedure operating unit 10, to the part other than the speech channels of the transmission circuit and multiplexes the encoded speech signals of each speech channel, which have been input from the speech encoders 7, and the transmission circuit allocation message input from the transmission circuit allocation control unit 9, and outputs the multiplexed signals to the transmission circuit.

The operation of the circuit multiple transmission system at the receiver's end will now be described.

The transmission circuit allocation control unit 9 extracts and encodes the transmission circuit allocation message input from the transmission circuit, and outputs the transmission circuit allocation data of the facsimile signals and the transmission circuit allocation data of the speech signals to the speech line allocating unit 16 of the receiver and the speech line allocating unit 16 of the receiver, respectively. According to the transmission line allocation data of the facsimile signals input from the transmission circuit allocation control unit 9, the transmission circuit allocating unit 16 of the receiver outputs the facsimile base band data signal, among of the input signals from the transmission circuit, to the corresponding trunk channels of the facsimile procedure operating unit 10 and also outputs the high-efficiency encoded speech signal of each speech channel of the transmission circuit to the speech decoder 13 without reloading. The speech decoder 13, like the speech encoder 7, is equipped with the same number of speech decoders as the number of total speech channels if all of the transmission circuit has been allocated for speech channels, and decodes the high-efficiency encoded speech signal of each speech channel input from the receiving line allocating unit 12 and outputs the resulting signal to the speech line allocating unit 16 of the receiver. According to the transmission circuit allocation data of the speech signals input from the transmission allocation control unit 9, the speech line allocating unit 16 outputs the receiver outputs the decoded speech signals of each speech channel of the transmission circuit, which have been input from the speech decoder 13, to the corresponding trunk channel of the selector 14. Also with the system of FIG. 7, it is possible to secure the same operation as that of FIG. 1.

As described above, in the foregoing embodiments, the system is equipped with a low bit rate speech encoder-decoder for encoding and decoding the speech signals and also with a facsimile modem for demodulating and modulating the facsimile signals, the transmission circuit is allocated to the speech channels, in which voice is with sound, and the channels occupied by facsimile transmission, according to the speech encoding rate and the data transmission rate of the facsimile signals, and sends the encoded speech signals when the voice is input. The facsimile modem demodulates the facsimile voiceband data signals, when the facsimile signals are input, and sends demodulated signals as base band data. In the system at the opposite end, the demodulated signals will be remodulated and output. This system is characterized by the facsimile procedure operating unit for operating the facsimile procedure for facsimile transmission to control the base band data transmission rate of the facsimile signals according to the status of a load of the transmission circuit.

Specifically, Embodiment 1 is characterized in that the facsimile procedure operating unit controls the base band data transmission rate of the facsimile signals by reloading part of the facsimile procedure control signal sent from the facsimile terminal.

Embodiment 2 is characterized in that the facsimile procedure operating unit controls the base band data transmission rate of the facsimile signal by selectively causing the training, which takes place prior to sending a message, to end in failure.

Embodiment 3 is characterized by providing a speech encoder-decoder with the same number of channels as the number of trunk channels accommodated by the system so that after all of the speech signals of each trunk channel have been high-efficiency encoded, allocation of the transmission circuit is performed to send voice.

This embodiment is also characterized by providing the speech encoder-decoder with the same number of channels as the maximum number of speech channels allocatable to the transmission circuit so that after the transmission circuit has been allocated for the speech signals of each trunk channel, encoding is performed to send voice.

According to these embodiments, since the system is equipped with the facsimile procedure operating unit, it is possible to control the facsimile base band data transmission rate, depending on the state of load of the transmission circuit. Therefore, in the circuit multiple transmission system having a DSI function, a high-density and high-efficiency snpeech encoding function and a facsimile signal base band sending function, it is possible to accommodate the same number of telephone lines as that if it is assumed that every input signal is a speech signal.

Embodiment 4

The foregoing embodiments, the circuit multiple transmission system multiplexes speech/facsimile signals for transmission. However, this invention should by no means be limited to multiplexing both the speech/facsimile signals and may be also applied to multiplexing only the facsimile signal. Assuming that four facsimile signals are multiplexed for three lines of 9600 b/s, the first and second facsimile signals send data at 9600 b/s and the third facsimile signal sends data at 4800 b/s, so that the fourth facsimile signal can be sent. Thus this invention can be applied even if there is no speech signal, i.e., if there is only one kind of signals such as facsimile signals.

Embodiment 5

In Embodiments 1 to 3, the circuit multiple transmission system sends speech/facsimile signals. This invention should by no means be limited to these embodiments and may be also applied to the case where communication signals such as of speech and personal computer communication are multiplexed. Alternatively, facsimile signals and other communication signals may be multiplexed. In another alternative example, three or more kinds of signals rather than two kinds of signals may be multiplexed.

As described above, according to this invention, since the data transmission rate is changed according to the status of load of the transmission circuit, it is possible to multiplex a predetermined number of kinds signals even if the transmission capacity is provided by only a limited number of transmission lines.

What is claimed is:

1. A circuit multiple transmission system for transmitting input signals, that include voice signals at a first transmission rate and facsimile signals at a second transmission rate, comprising:

(a) a transmission circuit allocation control unit for judging a load status of a transmission circuit by analyzing the input signals which are multiplexed to be transmitted by the system and by receiving information indicating whether the transmission system is being requested to transmit the input signals in excess of system capacity and designating a multiplexed data transmission rate that includes the first transmission rate for the voice signals and a third transmission rate, that is different from the second transmission rate, for the facsimile signals; and (b) a procedure operating unit for controlling a data transmission rate of the input signals based on the multiplexed data transmission rate designated by said transmission circuit allocation control unit.

2. A circuit multiple transmission system according to claim 1, wherein said procedure operating unit controls a baseband data transmission rate of the facsimile signals by reloading part of a facsimile procedure control signal sent from a facsimile terminal.

3. A circuit multiple transmission system according to claim 1, wherein said procedure operating unit controls a baseband data transmission rate of the facsimile signals by selectively causing a training, which takes place prior to sending a message, to end in a failure.

4. A circuit multiple transmission system comprising:

(a) a speech encoder for high-efficiency encoding a speech signal of a trunk channel;

(b) a speech decoder for decoding the encoded speech signal of the trunk channel;

(c) a facsimile modem for demodulating the facsimile signal modulated into a voiceband data signal of the trunk channel at the sender's end and for modulating the facsimile signal, which is demodulated into a base band data signal of the trunk channel at the receiver's end, into a voiceband data signal;

(d) a speech detector for discriminating whether the voice of the trunk channel is active or not;

(e) a transmission circuit allocation control unit for, based on the occupied-by-facsimile-transmission notifying signal from said facsimile modem and the speech detection signal from said speech detector, deciding allocation of the transmission circuit to the encoded speech signal and the facsimile base band data signal at the sender's end and for decoding allocation of the transmission circuit to the signals to be received from the transmission circuit;

(f) a sending line allocating unit for allocating the transmission circuit to the encoded speech signal and the facsimile base band data signal by a control signal from said transmission circuit allocation control unit;

(g) a receiving line allocating unit for allocating receiving lines to the speech signal, which is encoded from an input signal from the transmission circuit, and the facsimile base band data signal by the control signal from said transmission circuit allocation control unit; and (h) a facsimile procedure operating unit for, based on a data transmission rate designation signal from said transmission rate allocation control unit, controlling the facsimile base band data signal transmission rate by operating the facsimile procedure.

5. A circuit multiple transmission system according to claim 4, wherein said facsimile procedure operating unit includes:

(a) a DIS detector for detecting whether the facsimile signal of the trunk channel is a DIS;

(b) a DIS reloading unit for reloading the DIS of the trunk channel according to the transmission rate designation information under the control of said DIS detector; and (c) a selector for selectively output, under the control of said DIS detector, the output of said DIS reloading unit or the facsimile base band data signal input from said transmission circuit allocation control unit.

6. A circuit multiple transmission system according to claim 4, wherein said facsimile procedure operating unit includes:

(a) a DCS identification unit for supervising the facsimile base band data signal of the trunk channel input from said facsimile modem to detect whether the facsimile base band data signal is a DCS and for identifying the contents of the facsimile base band data signal; and (b) a selector for, based on the result of identification of said DCS identification unit, comparing the data transmission rate designated by the DCS with the designation speed of the transmission rate designation information input from said transmission circuit allocation control unit and outputting a dummy failure signal if the data transmission rate designated by the DCS is higher.

7. A circuit multiple transmission system comprising:

(a) a speech encoder for encoding a speech signal of a trunk channel;

(b) a speech decoder for decoding encoded speech signal of the trunk channel;

(c) a facsimile modem for demodulating the facsimile signal modulated into a voiceband data signal of the trunk channel at the sender's end and for modulating the facsimile signal, which is demodulated into a base band data signal of the trunk channel at the receiver's end, into a voiceband data signal;

(d) a speech detector for discriminating whether the voice of the trunk channel is active or not;

(e) a transmission circuit allocation control unit for, based on the occupied-by-facsimile-transmission notifying information from said facsimile modem and the speech detection signal from said speech detector, deciding allocation of transmission circuit to the encoded speech signal and the facsimile base band data signal at the sender's end and for decoding allocation of transmission circuit to the signals to be received from the transmission circuit;

(f) a sending line circuit allocating unit for allocating the facsimile signal sending lines by a control signal from said transmission circuit allocation control unit;

(g) a speech line allocation unit at the sender's end for outputting the speech signal of the trunk channel to said speech encoder of the allocated speech channel according to the information about the allocation of the speech signal transmission circuit by the control signal from said transmission circuit allocation control unit;

(h) a receiving line allocating unit for allocating facsimile signal receiving lines under the control signal from said transmission circuit allocation control unit;

(i) a speech line allocation unit at the receiver's end for allocating the speech signal receiving lines by the control signal from said transmission circuit allocation control unit; and (j) a facsimile procedure operating unit for, based on a transmission rate designation information from said transmission rate allocation control unit, controlling the facsimile base band data signal speed by operating the facsimile procedure.

8. An apparatus comprising:

a plurality of telephone circuits;

a transmitting part including speech encoders for low bit-rate encoding of speech signals included in input telephone circuits and for sending the encoded speech signals through a transmission channel allocating unit in a multiplexed manner, and facsimile demodulators for demodulating voiceband data signals of facsimile signals included in input telephone circuits into original baseband signals and for sending the demodulated voiceband data signals through the transmission channel allocating unit in a multiplexed manner;

a receiving part including a receiving channel allocation unit for separating multiplexed signals received from another apparatus, speech decoders for decoding low bit-rate encoded signals and for delivering the decoded low bit-rate encoded signals through corresponding telephone circuits, and facsimile modulators for re-modulating demodulated baseband signals into voiceband data signals to be delivered through corresponding telephone circuits;

a transmission channel assignment control part for designating a transmission rate of multiplexed speech signals and facsimile signals for each of the telephone circuits based on channel activity information of input telephone circuits; and a facsimile protocol control part for controlling a data transmission rate of the demodulated baseband signal of facsimile signals according to a transmission rate designated by the transmission channel assignment control part.

9. The apparatus of claim 8, wherein the facsimile protocol control part controls an encoding rate of the voiceband data signal by reloading part of facsimile connection protocol signal exchanged between a sending and a receiving facsimile terminal, and thereby controls a data transmission rate of each of the demodulated baseband signals.

10. The apparatus of claim 8, wherein the facsimile protocol control part controls an encoding rate of each of the voiceband data signals by selectively violating modem training procedures, for determining facsimile message transmission rates, in facsimile connection protocols between sending and receiving facsimile terminals, and thereby controlling data transmission rates of demodulated baseband signals.

11. An apparatus comprising:

(a) speech encoders for low bit-rate encoding speech signals of trunk channels;

(b) speech decoders for decoding the encoded speech signals of the trunk channels;

(c) facsimile modems for demodulating the facsimile signals which are modulated into voiceband data signals at facsimile terminals, into baseband signals and for re-modulating the facsimile signals, which are demodulated into baseband data signals of the trunk channel at the remote apparatus, into a voiceband data signal;

(d) a speech detector for discriminating whether the voice of the trunk channel is active or not:

(e) a transmission channel assignment control unit for, based on the facsimile discrimination signal from said facsimile modem and the speech detection signal from said speech detector, deciding assignment of the transmission channels to the encoded speech signals and the facsimile baseband data signals at the transmitting side and force decoding assignment of the transmission channels of the signals to be received from the transmission channels;

(f) a sending channel allocating unit for allocating the transmission channels to the encoded speech signals and the facsimile baseband data signals by a control signal from said transmission channel assignment control unit;

(g) a receiving channel allocating unit for re-allocating receiving channel signals to the speech decoders in case the signals are encoded speech signals at remote equipment and to the fax modem via facsimile protocol control units in case the signals are facsimile baseband data signal demodulated at remote equipment, by the control signal from said transmission channel assignment control unit; and (h) a facsimile protocol control unit for, based on a data transmission rate designation signal from said transmission circuit assignment control unit, controlling the facsimile baseband data signal transmission rate by controlling the facsimile protocols.

12. The apparatus of claim 11, wherein said facsimile protocol control unit includes:

(a) a Digital Identification Signal detector for detecting whether the facsimile signals of the trunk channels are a Digital Identification Signal;

(b) a Digital Identification Signal reloading unit for reloading the Digital Identification Signal of the trunk channels according to the transmission rate designation information under the control of said Digital Identification Signal detector; and (c) a selector for selectively output, under the control of said Digital Identification Signal detector, the output of said Digital Identification Signal reloading unit or the facsimile baseband data signal input tom said receiving channel allocating unit.

13. The apparatus of claim 11, wherein said facsimile protocol control unit includes:

(a) a Digital Command Signal identification unit for supervising the facsimile baseband data signals of the trunk channels inputs from said facsimile modem to detect whether the facsimile baseband data signals are Digital Command Signal and for identifying the contents of the facsimile baseband data signals; and (b) a selector for, based on the result of identification of said Digital Command Signal identification unit, comparing the data transmission rates designated by the Digital Command Signal with the designation speed of the maximum transmission rates designation information inputs from said transmission channel assignment control unit and outputting a dummy violating signals if the data transmission rates designated by the Digital Command Signal are higher.

14. An apparatus comprising:

(a) speech encoders for encoding speech signals of trunk channels;

(b) speech decoders for decoding encoded speech signals of the trunk channels;

(c) facsimile modems for demodulating the facsimile signals which are modulated into voiceband data signals at facsimile terminals, into baseband signals and for re-modulating the facsimile signals, which are demodulated into baseband data signals of the trunk channel at the remote apparatus, into voiceband data signals;

(d) a speech detector for discriminating whether the voice of the trunk channel is active or not:

(e) a transmission channel assignment control unit for, based on the facsimile discrimination information from said facsimile modem and the speech detection signal from said speech detector, deciding assignment of the transmission channels to the encoded speech signals and the facsimile baseband data signals at the transmitting side and for decoding re-allocation of received transmission channel signals to the speech decoders and to the modulator via facsimile protocol control unit at the receiving side;

(f) a sending channel allocating unit for allocating the facsimile signal sending channels by a control signal from said transmission channel assignment control unit;

(g) a speech channel allocation unit at the transmitting side for outputting the speech signal of the trunk channel to said speech encoders of the assigned speech channel according to the information about the assignment of the speech signal transmission channel by the control signal from said transmission channel assignment control unit;

(h) a receiving channel allocating unit for re-allocating speech coding signal receiving channels to the speech decoders and facsimile signal receiving channels to the fax modem via facsimile protocol control unit under the control signal from said transmission channel assignment;

(I) a speech channel allocation unit at the receiving side for assigning the channel receiving side by the control signal from said transmission channel assignment control unit; and (j) a facsimile protocol control unit for, based on a transmission rate designation information from said transmission channel assignment control unit, controlling the maximum facsimile baseband data signal speed by controlling the facsimile protocol.

* * * * *